(12) United States Patent
Mochizuki et al.

(10) Patent No.: US 8,157,427 B2
(45) Date of Patent: Apr. 17, 2012

(54) VEHICLE HEADLAMP INCLUDING CONTROL TO REDUCE ILLUMINANCE OF ADDITIONAL LIGHT DISTRIBUTION PATTERN AND METHOD OF CONTROLLING THE SAME

(75) Inventors: Kiyotaka Mochizuki, Shizuoka (JP); Naoki Tatara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 493 days.

(21) Appl. No.: 12/401,645

(22) Filed: Mar. 11, 2009

(65) Prior Publication Data

US 2009/0231867 A1 Sep. 17, 2009

(30) Foreign Application Priority Data

Mar. 12, 2008 (JP) ................................ 2008-062677

(51) Int. Cl.
*B60Q 1/16* (2006.01)
(52) U.S. Cl. .......................................... 362/464; 315/82
(58) Field of Classification Search .......... 362/464–466; 315/82
See application file for complete search history.

(56) References Cited

U.S. PATENT DOCUMENTS

| | | | | |
|---|---|---|---|---|
| 5,562,336 A * | 10/1996 | Gotou | ............................ | 362/466 |
| 5,567,032 A * | 10/1996 | Heizmann | ....................... | 362/37 |
| 5,798,911 A * | 8/1998 | Josic | .............................. | 362/466 |
| 6,144,158 A | 11/2000 | Beam | | |
| 6,443,603 B1 * | 9/2002 | Eberhardt | ..................... | 362/465 |
| 7,287,884 B2 * | 10/2007 | Koike | ........................... | 362/464 |
| 7,565,006 B2 * | 7/2009 | Stam et al. | ..................... | 382/155 |
| 2007/0201241 A1 | 8/2007 | Komatsu | | |

FOREIGN PATENT DOCUMENTS

| | | |
|---|---|---|
| DE | 10 2005 038 581 A1 | 3/2007 |
| EP | 0 869 031 A2 | 10/1998 |
| EP | 1 707 438 A1 | 10/2006 |
| JP | 2007-290612 A | 11/2007 |

OTHER PUBLICATIONS

EPO Machine Translation of Description DE102005038581, Jul. 18, 2011, pp. 1-2.*
EPO Machine Translation of Claims DE102005038581, Jul. 18, 2011, p. 1.*
Extended European Search Report issued Jun. 7, 2010 in counterpart European Application No. 09003518.9.

* cited by examiner

*Primary Examiner* — Alan Cariaso
(74) *Attorney, Agent, or Firm* — Sughrue Mion, PLLC (57) ABSTRACT

A vehicle headlamp is provided. The vehicle headlamp includes a light source which is configured to form an additional light distribution pattern which is formed above a cut-off line of a low-beam mode light distribution pattern; a vehicle detection device which is configured to detect a presence of a front running vehicle; a road position detection device which is configured to detect an existing area of a road ahead; and a control unit. The control unit acquires information from the vehicle detection device and the road position detection device and, when the existing area includes a non-detectable area which is outside of a detectable area of the vehicle detection device, controls the light source to reduce an illuminance of the additional light distribution pattern.

8 Claims, 7 Drawing Sheets

VEHICLE HEADLAMP INCLUDING CONTROL TO REDUCE ILLUMINANCE OF ADDITIONAL LIGHT DISTRIBUTION PATTERN AND METHOD OF CONTROLLING THE SAME

This application claims priority from Japanese Patent Application No. 2008-062677, filed on Mar. 12, 2008, the entire contents of which are hereby incorporated by reference.

BACKGROUND OF THE INVENTION

1. Technical Field

Devices, apparatuses, and methods consistent with the present disclosure relate to vehicle headlamps and, more particularly, to vehicle headlamps which control illuminance.

2. Related Art

In general, a vehicle headlamp provided on a vehicle can switch between a low-beam mode and a high-beam mode. The low-beam mode illuminates a place in the vicinity of a front running vehicle with a certain illuminance in order not to cause glare light to the front running vehicle. The front running vehicle includes an oncoming vehicle and/or a leading vehicle which travels in front of and in the same direction as the vehicle. The low-beam mode is mainly used when the vehicle runs in an urban district. On the other hand, the high-beam mode illuminates the front side in a wide range at a distance with a relatively high illuminance. The high-beam mode is generally used when the vehicle runs at high speed on a road where there are relatively few front running vehicles. Even though the high-beam mode is superior in visibility compared with the low-beam mode, there is a disadvantage in that the high-beam mode causes more glare light to a driver of a front running vehicle.

JP-A-2007-290612 describes a related art headlamp control technique in which a vehicle detection device such as an image sensor or the like detects the existence of a front running vehicle. When the front running vehicle is not detected, an illumination state of the headlamp of the vehicle is automatically switched from the low-beam mode to the high-beam mode, so that the visibility of the driver is secured and the glare to the front running vehicle is reduced.

When the above-mentioned related art control is performed, for example, in the case where the vehicle runs on a curved road, the front running vehicle is repeatedly in or out of a detectable area of the vehicle detection device. Accordingly, when the vehicle runs on a curved road using a sensor with automatic switching, switching from the low-beam mode to the high-beam mode and from the high-beam mode to the low-beam mode is frequently performed. However, one way for a driver of a vehicle following another vehicle to signal a desire to pass the vehicle is to rapidly switch the headlamp mode from high-beam mode to low-beam mode, and back again. Accordingly, there is a disadvantage with the related art control technique in that a driver of the front running vehicle may falsely recognize that a following vehicle wants to pass. Accordingly, in JP-A-2007-290612, when the vehicle is in a specific state such as running on the curved road, the illumination state of the headlamp is maintained in an illumination state (i.e., not automatically switched) when it is determined that one is in the specific state.

In a case in which the vehicle is in the specific state and the illumination state of the headlamp is the high-beam mode, the illumination state is maintained in the high-beam mode in order to maintain the illumination state of the headlamp when the vehicle is in the specific state. For example, when the vehicle which is running on a straight road enters a curved road portion while in the high-beam mode because there is no front running vehicle, the vehicle comes to be in the specific state due to entering the curved road, and the illuminance state of the headlamp is maintained in the high-beam mode. However, there is a disadvantage in that when the following vehicle comes up on and encounters a front running vehicle before passing through a bent area of the curved road, the front running vehicle comes to be illuminated in the high-beam mode, causing increased glare to the front running vehicle.

In addition, even if the illumination state of the headlamp is switched based on information from a vehicle detection means instead of maintaining the illumination state of the headlamp, there is a disadvantages in that the front running vehicle may be already illuminated in the high-beam mode at a point of time when the front running vehicle is detected in front of the curved road, causing increased glare to the front running vehicle.

SUMMARY OF THE INVENTION

Exemplary embodiments of the present invention address the foregoing disadvantages and other disadvantages not described above. However, the exemplary embodiments of the present invention are not required to overcome the disadvantages described above and, thus, some implementations of the present invention may not overcome the specific disadvantages described above.

Accordingly, illustrative aspects of the present invention provide a vehicle headlamp that can secure visibility of a driver and reduce glare caused to a front running vehicle.

According to an exemplary embodiment of the present invention, a vehicle headlamp is provided. The vehicle headlamp comprises a light source which is configured to form an additional light distribution pattern which is formed above a cut-off line of a low-beam mode light distribution pattern; a vehicle detection device which is configured to detect a presence of a front running vehicle; a road position detection device which is configured to detect an existing area of a road ahead; and a control unit which is configured to acquire information from the vehicle detection device and the road position detection device and, when the existing area includes a non-detectable area which is outside of a detectable area of the vehicle detection device, the control unit controls the light source to reduce an illuminance of the additional light distribution pattern.

According to another exemplary embodiment of the present invention, there is provided a method of controlling a vehicle headlamp. The method includes reducing an illuminance of an additional light distribution pattern which is formed above a cut-off line of a low-beam mode light distribution pattern, when an existing area of a road ahead includes an area where a front running vehicle cannot be detected.

Other aspects, features and advantages of the invention will be apparent from the following description, the drawings and the claims.

DETAILED DESCRIPTION OF EXEMPLARY EMBODIMENTS OF THE INVENTION

Exemplary embodiments of the present invention will be now described with reference to the drawings.

The same or equivalent elements, members, and processes shown in the drawings are designated by the same reference numerals and repeated description thereof will be omitted.

In a vehicle headlamp according to an exemplary embodiment of the present invention, when an existing area of a road ahead includes an area where a vehicle ahead cannot be detected, an illuminance of an additional light distribution pattern which includes an upper area from a cut-off line of a low-beam mode light distribution pattern is reduced.

Figure 1:
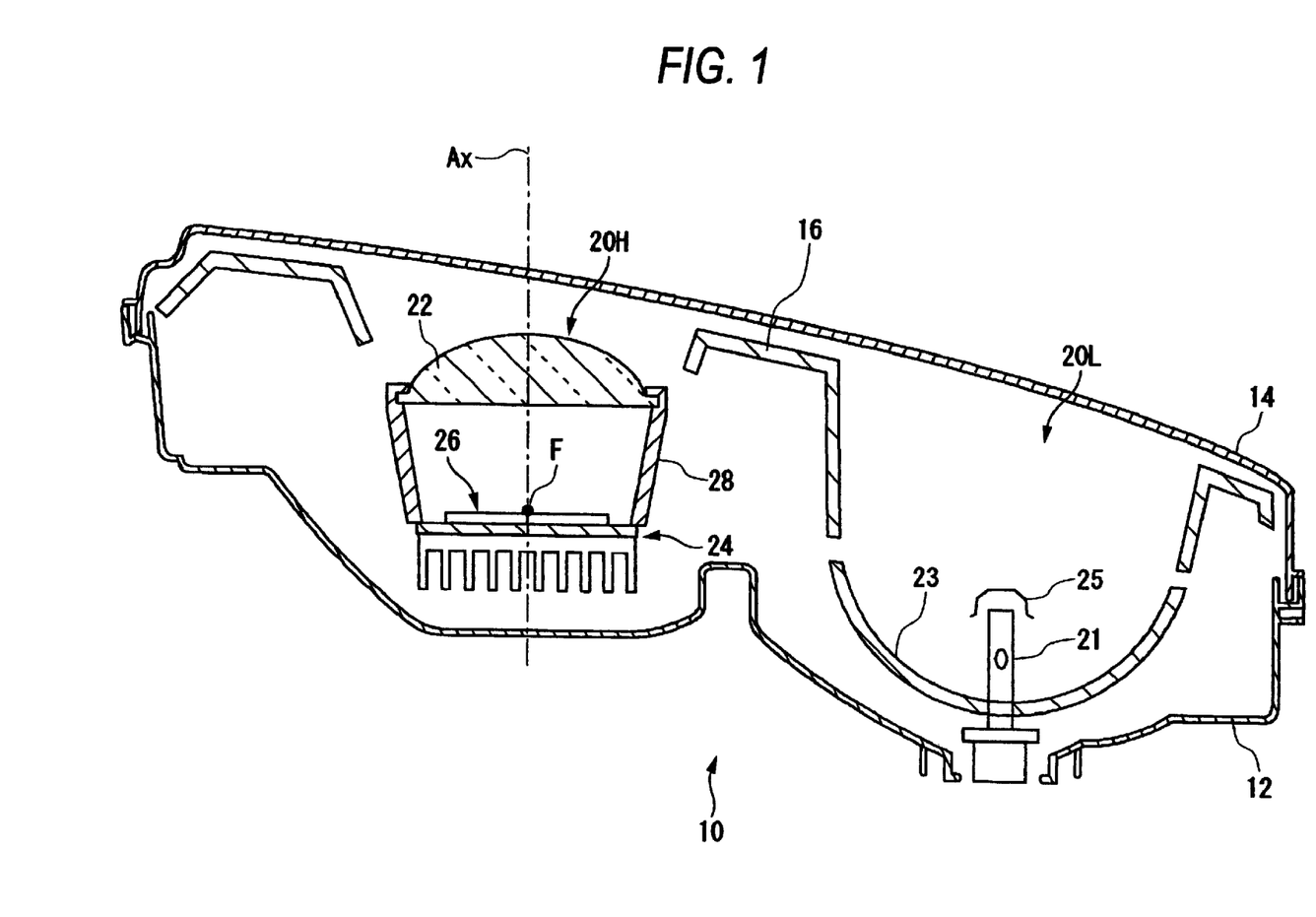
FIG. 1 is a horizontal sectional view schematically illustrating a vehicle headlamp according to an exemplary embodiment of the present invention.

FIG. 1 is a horizontal sectional view schematically illustrating the vehicle headlamp according to an exemplary embodiment of the present invention.

The vehicle headlamp 10 according to accommodates a low-beam mode lamp 20L and a high-beam mode lamp 20H in an interior of a lamp housing which is formed by a lamp body 12 and a translucent cover 14. The translucent cover 14 is attached to an opening at the front end of the lamp body 12. Hereinafter, the low-beam mode lamp 20L and the high-beam mode lamp 20H is collectively referred to as a lamp. The low-beam mode lamp 20L and the high-beam mode lamp 20H are attached to the lamp body 12 by a support member (not shown). In addition, an extension member 16 having an opening in an area where the low-beam mode lamp 20L and the high-beam mode lamp 20H exist is fixed to the lamp body 12 or the translucent cover 14, and covers the front opening of the lamp body 12 and an area between the low-beam mode lamp 20L and the high-beam mode lamp 20H.

The low-beam mode lamp 20L is a reflection type lamp, and includes a light source bulb 21 and a reflector 23. In the low-beam mode lamp 20L, light emitted from the light source bulb 21 is reflected by the reflector 23, and a part of the light traveling forward from the reflector 23 is cut by using a light shield plate (not shown), so that a low-beam mode light distribution pattern having a certain cut-off line is formed. A shade 25 is provided at the tip of the light source bulb 21, which cuts the light emitted from the light source bulb 21 and traveling directly forward. In addition, a shape of the low-beam mode lamp 20L is not particularly limited thereto. For example, the low-beam mode lamp 20L may be the same projector type lamp as the high-beam mode lamp 20H to be described later.

The high-beam mode lamp 20H is a projector type lamp, and includes a projector lens 22, a light source unit 24 which is provided with a light source 26 for high-beam illumination, and a holder 28 which holds the projector lens 22 and the light source unit 24. The projector lens 22 is an aspherical plano-convex lens where the front surface is a convex surface and the rear surface is a plain surface, which is disposed on a light axis Ax which is extended in a forward or backward direction of the vehicle. The projector lens 22 projects an image on a back focal plane including the back focus F thereof as a reverted image onto a vertical virtual screen which is disposed in front of the lamp. The peripheral portion of the projector lens 22 is held in a circular groove in front end of the holder 28.

The light source unit 24 is provided such that the light source 26 faces a forward direction of the light axis Ax direction. The light source 26 is disposed further to the rear side than the back focus F of the projector 22, and held at the rear end side of the holder 28. Further, the light source unit 24 is disposed so as to perform a direct light illumination from the light source 26 to the projector lens 22. The holder 28 is attached to the lamp body 12 through a support member (not shown). In addition, a shape of the high-beam mode lamp 20H is not particularly limited thereto. For example, the high-beam mode lamp 20H may be the same reflection type lamp as the low-beam mode lamp 20L.

Figure 2:
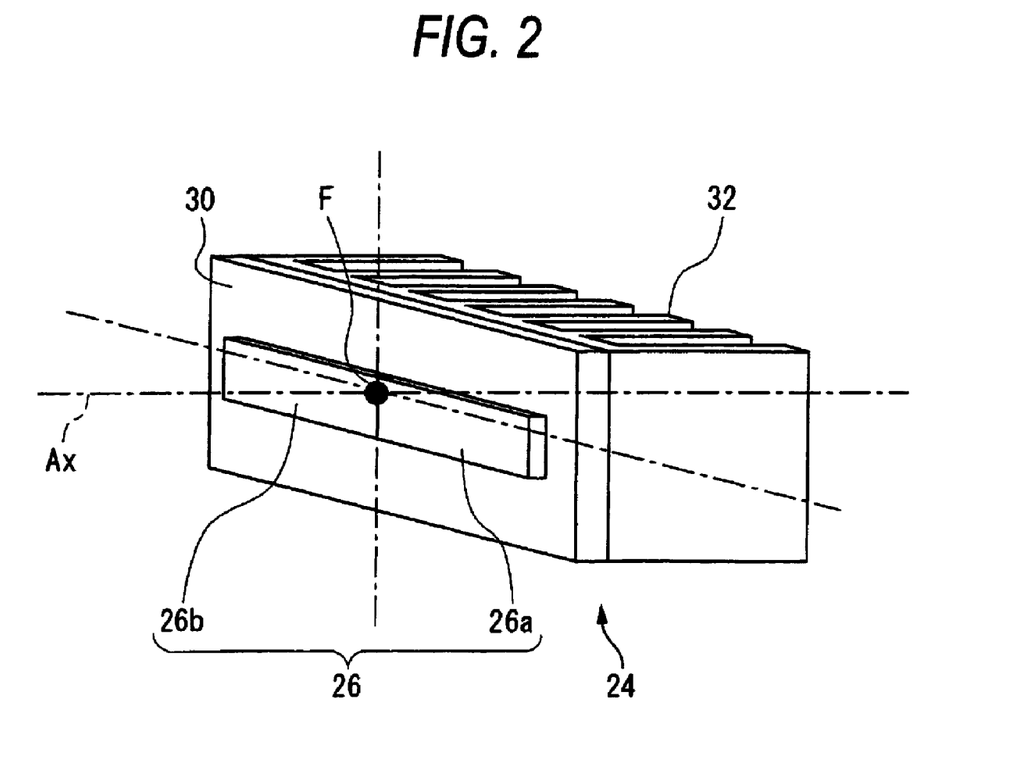
FIG. 2 is a diagram schematically illustrating a light source unit of a high-beam mode lamp of the vehicle headlamp of FIG. 1.

FIG. 2 is a diagram schematically illustrating the light source unit 24 of a high-beam mode lamp 20H.

The light source unit 24 includes a light source 26, a support plate 30, and a heat sink 32. The light source 26 is made of a light emitting element, such as a light emitting diode (LED), and is fixed on a front surface of the support plate 30 such that an emitting surface of the light source 26 faces the forward direction of the light axis Ax direction. The light source 26 is disposed such that a central point thereof is located further to the lower side than the back focus F of the projector lens 22. In addition, the light source 26 is divided into a plurality of separate light sources 26a and 26b in which an illumination of the light is separately controlled by a headlamp control ECU 40 to be described later. Accordingly, the vehicle headlamp 10 can increase or decrease the illuminance in a partial area of the high-beam mode light distribution pattern. The separate light sources 26a and 26b are formed in a substantially rectangular shape, and horizontally disposed in a single line so as to be adjacent to each other. In addition, the light source 26 is not limited to the LED. For example, the light source 26 may alternatively be a light bulb. However, it is advantageous to use the LED which can more easily increase or decrease the illuminance of the light source. In this exemplary embodiment, two separate light sources 26a and 26b are provided. However, more than two light sources may alternatively be provided.

The heat sink 32 is a member for diffusing heat generated from the light source 26, and is attached to a surface of the support plate 30 on a rear side of the vehicle. The light source unit 24 is fixed at the holder 28 through the support plate 30. In addition, the separate light sources 26a and 26b may be formed such that the plurality of emitting elements are disposed in a matrix shape.

Figure 3:
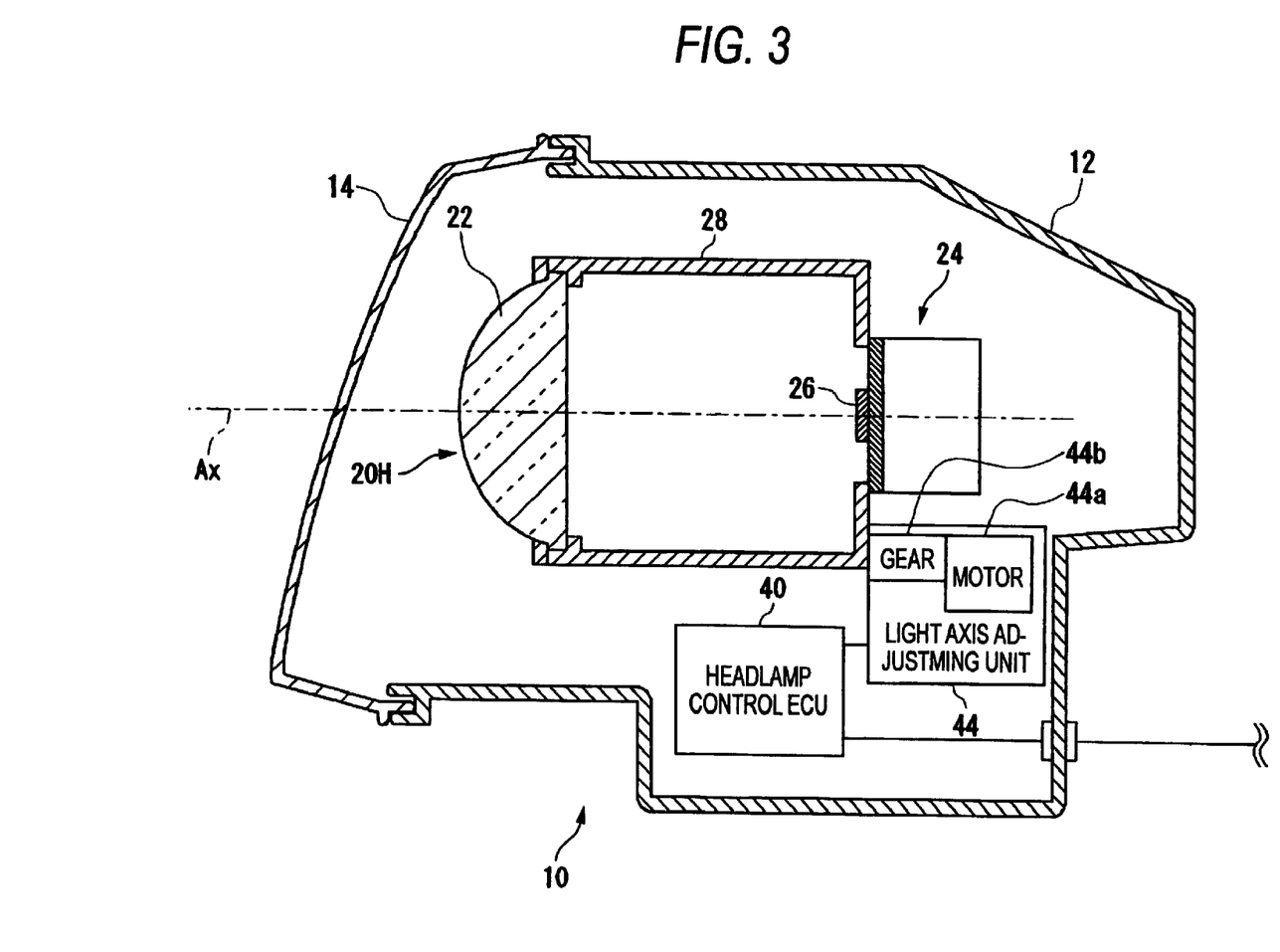
FIG. 3 is a sectional side view schematically illustrating the high beam mode lamp of FIG. 2.

Further, the high-beam mode lamp 20H is provided with a light axis adjusting unit which adjusts an angle of the light axis Ax thereof. FIG. 3 is a sectional side view schematically illustrating an exemplary embodiment of the vehicle headlamp 10.

As shown in FIG. 3, the high-beam mode lamp 20H is pivotably held on the lamp body 12 in horizontal and vertical directions through a support member (not shown). In addition, a light axis adjusting unit 44 is provided such that the high-beam mode lamp 20H is pivoted in horizontal and vertical directions. The light axis adjusting unit 44 includes a motor 44a and a gear 44b which transports a driving force of the motor 44a to the high-beam mode lamp 20H. An angle adjustment of the light axis of the high-beam mode lamp 20H is controlled by the headlamp control ECU 40 to be described later.

Figure 4:
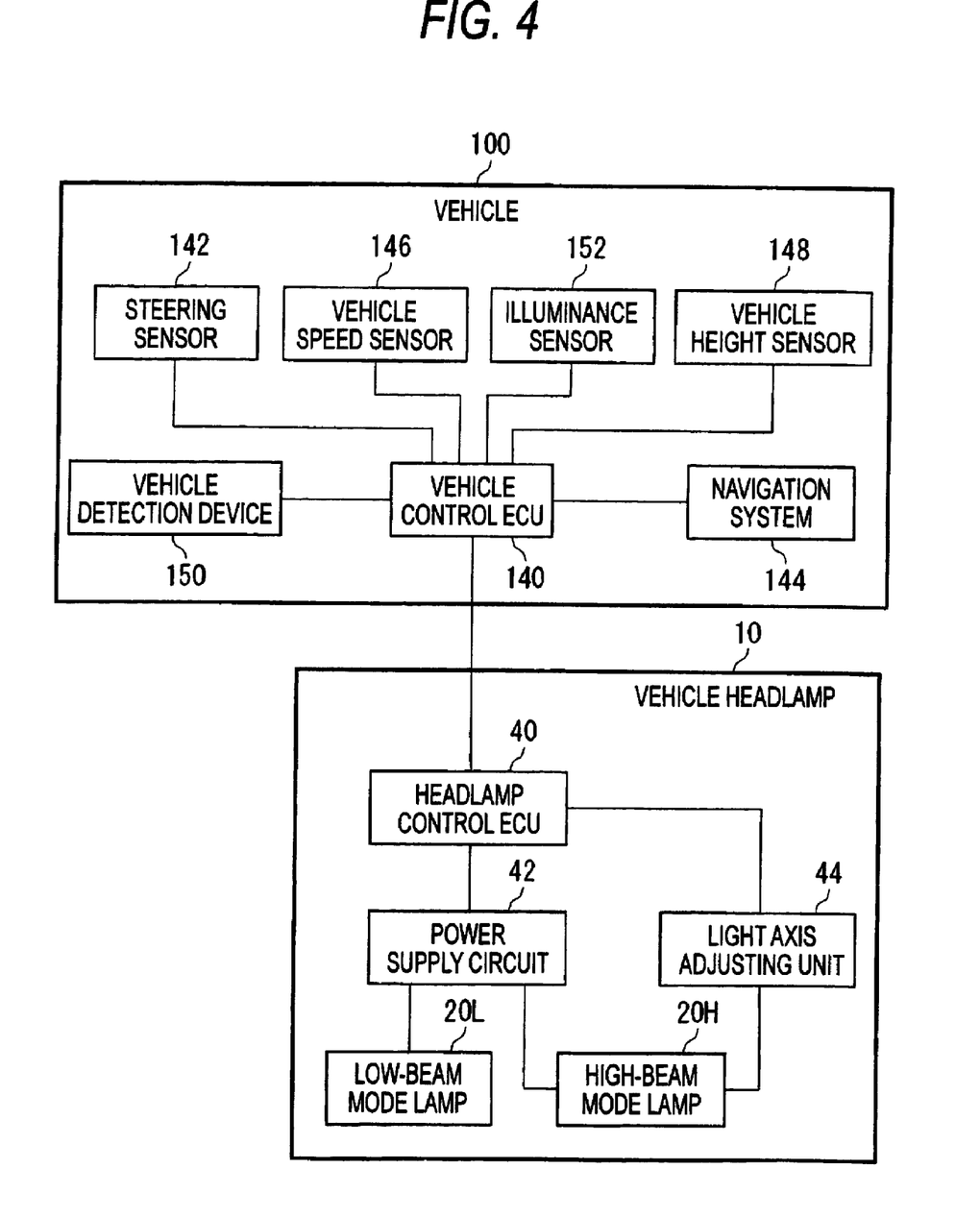
FIG. 4 is an example of a control block diagram illustrating the vehicle headlamp of FIG. 1.

FIG. 4 is an example of a control block diagram illustrating the vehicle headlamp 10 according to an exemplary embodiment of the present invention.

The vehicle headlamp 10 is provided with the headlamp control ECU 40 which is a control means for controlling the illumination of the low-beam mode lamp 20L and the high-beam mode lamp 20H, and a power supply circuit 42 which supplies power to the low-beam mode lamp 20L and the high-beam mode lamp 20H in order to turn on the low-beam mode lamp 20L and the high-beam mode lamp 20H based on a control signal from the headlamp control ECU 40. In addition, the vehicle headlamp 10 is provided with the light axis adjusting unit 44 which adjusts the light axis of the high-beam mode lamp 20H based on the control signal from the headlamp control ECU 40. In the vehicle 100, a vehicle control ECU 140 which controls the vehicle 100, a steering sensor 142 which detects a steering angle of a steering, and a navigation system 144 which is a road position detecting device having road information are provided. Further, in the vehicle 100, a vehicle speed sensor 146 which detects a speed of the vehicle 100 and a vehicle height sensor 148 which detects a height of the vehicle 100 are provided. In addition, in the vehicle 100, a vehicle detection device 150 which detects the existence of the front running vehicle is provided. The vehicle detection device 150 is provided with an image sensing camera (not shown) which uses a solid-state image sensing element, for example, such as a CCD and a MOS. Since the image sensing camera has a certain image sensing range, the vehicle detection device 150 has a certain detection range. In addition, the vehicle detection device 150 is provided with an image recognizing unit (not shown), in which an image analysis is performed by signal processing on an image sensed by the image sensing camera, the existence of the front running vehicle, such as an oncoming vehicle or a leading vehicle, in front of the vehicle 100 is recognized, and an inter-vehicle distance between the recognized front running vehicle and the vehicle 100 is detected. Further, in the vehicle 100, an illuminance sensor 152 which detects an illuminance in the vicinity of the vehicle 100 is provided.

When the vehicle control ECU 140 receives an instruction on the low-beam mode or the high-beam mode from the driver, the vehicle control ECU 140 outputs a control signal to the headlamp control ECU 40. The headlamp control ECU 40 controls the power supply circuit 42 based on the control signal from the vehicle control ECU 140, so as to perform an ON/OFF control on the low-beam mode lamp 20L and the high-beam mode lamp 20H. Further, the headlamp control ECU 40 can automatically switch an illumination state of the headlamp between the low-beam mode and the high-beam mode according to a detection result by the vehicle detection device 150. For example, automatic switching control is performed in the case where the low-beam mode and the automatic switching control are instructed by the driver. In addition, when performing the automatic switching control, the headlamp control ECU 40 obtains information from the vehicle detection device 150 and the navigation system 144 so as to perform the illumination control on the high-beam mode lamp 20H to be described later.

In addition, the vehicle headlamp 10 can control a division illumination in the high-beam mode according to the existence position of the front running vehicle. The division illumination control in the high-beam mode is performed as follows. That is, first, the existence of the front running vehicle is detected by the vehicle detection device. When receiving the control signal from the vehicle control ECU 140, the headlamp control ECU 40 changes a magnitude of power which is outputted from the power supply circuit 42 according to a positional relation between the existence position of the vehicle detected by the vehicle detection device and a partial area of the high-beam mode light distribution pattern. Therefore, the headlamp control ECU 40 adjusts individually the illuminations of the separate light sources 26a and 26b, so as to control the separate light sources 26a and 26b to additionally illuminate the light to the low-beam light distribution pattern.

Specifically, when the front running vehicle is detected by the vehicle detection device 150, the headlamp control ECU 40 illuminates such that the illuminance of the partial area of the high-beam mode light distribution pattern which is formed by the separate light source 26b which illuminates a lane of the vehicle 100 is lower than that of a partial area of the high-beam mode light distribution pattern which is formed by the separate light source 26a which illuminates the lane of the oncoming vehicle. Further, when the oncoming vehicle is detected by the vehicle detection device 150, the headlamp control ECU 40 illuminates such that the illuminance of the partial area of the high-beam mode light distribution pattern which illuminates the lane of the oncoming vehicle is lower than that of the partial area of the high-beam mode light distribution pattern which illuminates the lane of the vehicle 100. Therefore, while reducing the glare caused to the front running vehicle, it is possible to secure the visibility of the driver of the vehicle 100. In addition, the illuminance of the partial area where the front running vehicle exists, for example, may be set below a threshold illuminance in which the glare is not caused to the driver of the front running vehicle and the visibility of the driver of the vehicle 100 can be secured. Alternatively, the illuminance may be set to zero, so that only a partial area where no front running vehicle exists may be added to the low-beam mode light distribution pattern.

Further, in the vehicle headlamp 10, a swivel operation of the high-beam mode headlamp 20H can be performed according to running states of the vehicle 100. The swivel operation in the high-beam mode is performed as follows. That is, the vehicle control ECU 140 recognizes the running states of the vehicle 100 based on signals from the steering sensor 142, the navigation system 144, and the vehicle speed sensor 146, etc., and outputs the control signal to the headlamp control ECU 40. When the vehicle 100 is recognized as being in a certain running state, for example, that the vehicle is running on the curved road, the headlamp control ECU 40 outputs the control signal so as to adjust the angle of the light axis Ax of the high-beam mode lamp 20H with respect to the light axis adjusting unit 44 according to the running state of the vehicle 100. The light axis adjusting unit 44 drives the motor 44a based on the control signal from the headlamp control ECU 40, and thus the drive force of the motor 44a is transmitted to the high-beam mode lamp 20H through the gear 44b. As a result, an angle in a horizontal direction of the light axis Ax of the high-beam mode lamp 20H is adjusted, and thus the high-beam mode lamp 20H is swiveled in accordance with the existing area of the curved road. Therefore, when the visibility in a road surface of a driving course is low (for example, when the vehicle 100 is running on the curved road), it is possible to secure the visibility of the driver.

In addition, the vehicle headlamp 10 can adjust the light axis Ax of the high-beam mode lamp 20H in a vertical direction according to the inter-vehicle distance between the front running vehicle and the vehicle 100, that is, it is possible to perform a track leveling control on the front running vehicle.

The track leveling control on the front running vehicle is performed as follows. Specifically, the vehicle detection device 150 detects the inter-vehicle distance between the front running vehicle and the vehicle 100. Further, the vehicle height sensor 148 detects a height of the vehicle 100. The vehicle control ECU 140 outputs the control signal to the headlamp control ECU 40 based on signals from the vehicle detection device 150 and the vehicle height sensor 148. The headlamp control ECU 40 outputs the control signal so as to adjust the angle of the light axis Ax of the high-beam mode lamp 20H with respect to the light axis adjusting unit 44 according to the inter-vehicle distance and the vehicle height of the vehicle 100. The light axis adjusting unit 44 drives the motor 44a based on the control signal from the headlamp control ECU 40, and thus the drive force of the motor 44a is transmitted to the high-beam mode lamp 20H through the gear 44b. Accordingly, an angle in a vertical direction of the light axis Ax of the high-beam mode lamp 20H is adjusted, and thus the track leveling control on the front running vehicle is performed. Therefore, while reducing the glare caused to the front running vehicle, it is possible to secure the visibility of the driver.

In addition, the low-beam mode lamp 20L may also adjust the angle of the light axis thereof. Therefore, it is possible to perform the swivel operation and the track leveling control on the front running vehicle of the low-beam mode lamp 20L. Further, the headlamp control ECU 40 receives the signal from the vehicle control ECU 140 and controls the vehicle headlamp 10. However, the headlamp control ECU 40 may also control the vehicle headlamp 10 directly by receiving the signal from the steering sensor 142, the navigation system 144, the vehicle speed sensor 146, the vehicle height sensor 148, and the vehicle detection device 150.

Figure 5:
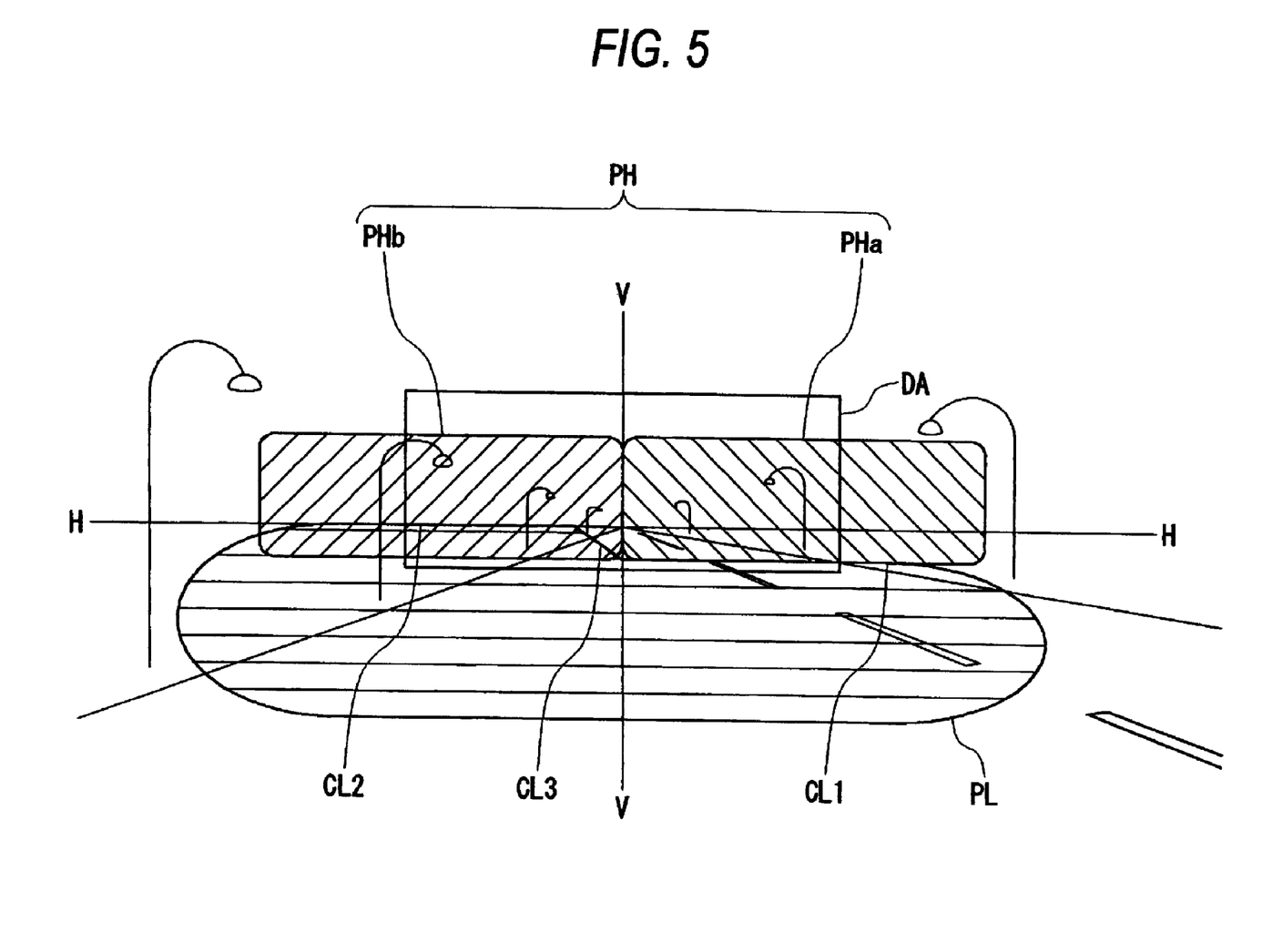
FIG. 5 is a diagram illustrating low-beam mode and high-beam mode light distribution patterns which are formed on a vertical virtual screen disposed at a certain position forward of the vehicle lamp, and a detectable area of a vehicle detection device.

FIG. 5 is a diagram illustrating low-beam mode and high-beam mode light distribution patterns which are formed on a vertical virtual screen disposed at a certain position in front of the lamp (for example, at a position about 25 m in front of the lamp, and the detectable area of the vehicle detection device 150).

According to the vehicle headlamp 10, the high-beam mode light distribution pattern PH shown in FIG. 5 is formed by an illumination light from the high-beam mode lamp 20H. The high-beam mode light distribution pattern PH is additionally formed with respect to the low-beam mode light distribution pattern PL which is formed by the illumination light from the low-beam mode lamp 20L. The high-beam mode light distribution pattern PH is divided into partial areas PHa and PHb. The partial areas PHa and PHb are horizontally arranged in a single line and are formed into a substantially rectangular shape which is formed by the separate light sources 26a and 26b. When the automatic switching control on the headlamp is selected, all or a part of the partial areas PHa and PHb is adjusted in illuminance and selectively added with respect to the low-beam mode light distribution pattern PL. Thus, a different light distribution pattern in which the visibility in the road surface of the driving course of the vehicle 100 is increased is formed. In addition, the vehicle detection device 150 detects the existence of the front running vehicle in the detectable area DA.

The low-beam mode light distribution pattern PL shown in FIG. 5 is a low-beam mode light distribution pattern for a left light distribution, and has cut-off lines CL1, CL2, and CL3 where right and left on the edge of the top end thereof are different. The cut-off line CL1 is disposed further to the right side than a vertical line V-V which passes through a vanishing point in the front direction of the vehicle headlamp 10, and is formed so as to be extended in a horizontal direction as a cut-off line of the lane of the oncoming vehicle. The cut-off line CL2 is disposed further to the left side than the vertical line V-V, and is formed so as to be extended in a horizontal direction as a cut-off line of the lane of the vehicle 100 at a higher position than the cut-off line CL1. Further, the cut-off line CL3 is formed as an inclined cut-off line which is connected between an end portion of the cut-off line CL2 on the side of the vertical line V-V and an end portion of the cut-off line CL1 on the side of the vertical line V-V. The cut-off line CL3 is extended at about a 45 degree inclination angle to an upper left inclination from an intersection point between the cut-off line CL1 and the vertical line V-V.

When the high-beam mode is selected, the low-beam mode lamp 20L and the high-beam mode lamp 20H are turned on, and a light illumination in the high-beam mode is performed by the high-beam mode light distribution pattern PH and the low-beam mode light distribution pattern PL. Further, when the low-beam mode is selected, the low-beam mode lamp 20L is turned on, and a light illumination in the low-beam mode is performed by the low-beam mode light distribution pattern PL. In addition, when the low-beam mode and the automatic switching control are selected, the illumination state of the headlamp is automatically controlled to be switched according to the detection result of the vehicle detection device 150. In general, when the front running vehicle is not detected by the vehicle detection device 150, the low-beam mode lamp 20L and the high-beam mode lamp 20H are turned on, and the light illumination is performed by the low-beam mode light distribution pattern PL and the high-beam mode light distribution pattern PH. On the other hand, when the front running vehicle is detected by the vehicle detection device 150, the division illumination control of the high-beam mode or the track leveling control on the front running vehicle described above is performed. Alternatively, the light illumination in the low-beam mode is performed only by the low-beam mode lamp 20L. In this case, the light source 26 of the high-beam mode lamp 20H corresponds to a light source which forms the additional light distribution pattern including an upper area from the cut-off lines CL1, CL2, and CL3 of the low-beam mode light distribution pattern PL, and the high-beam mode light distribution pattern PH corresponds to the additional light distribution pattern.

Figure 6A:
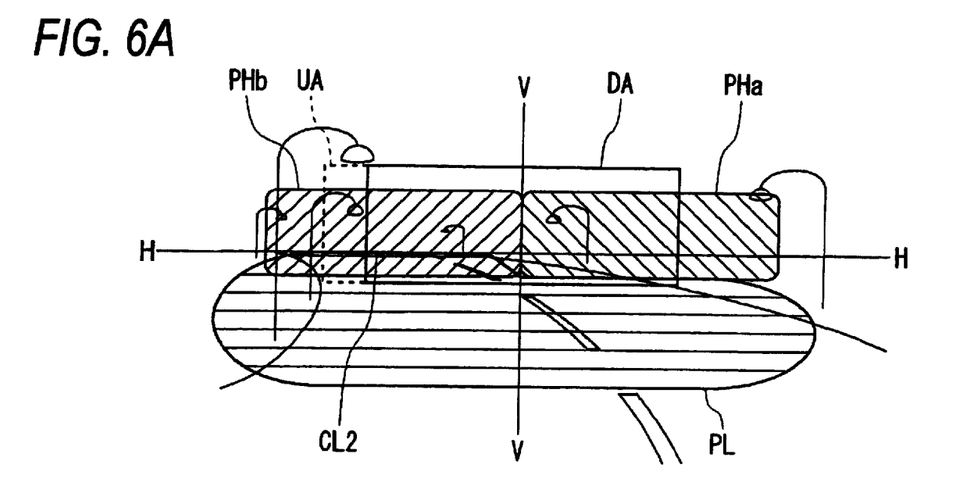
FIGS. 6A and 6B are schematic views to explain a control for forming a light distribution pattern when a vehicle is running on a left curved road.
Figure 6B:
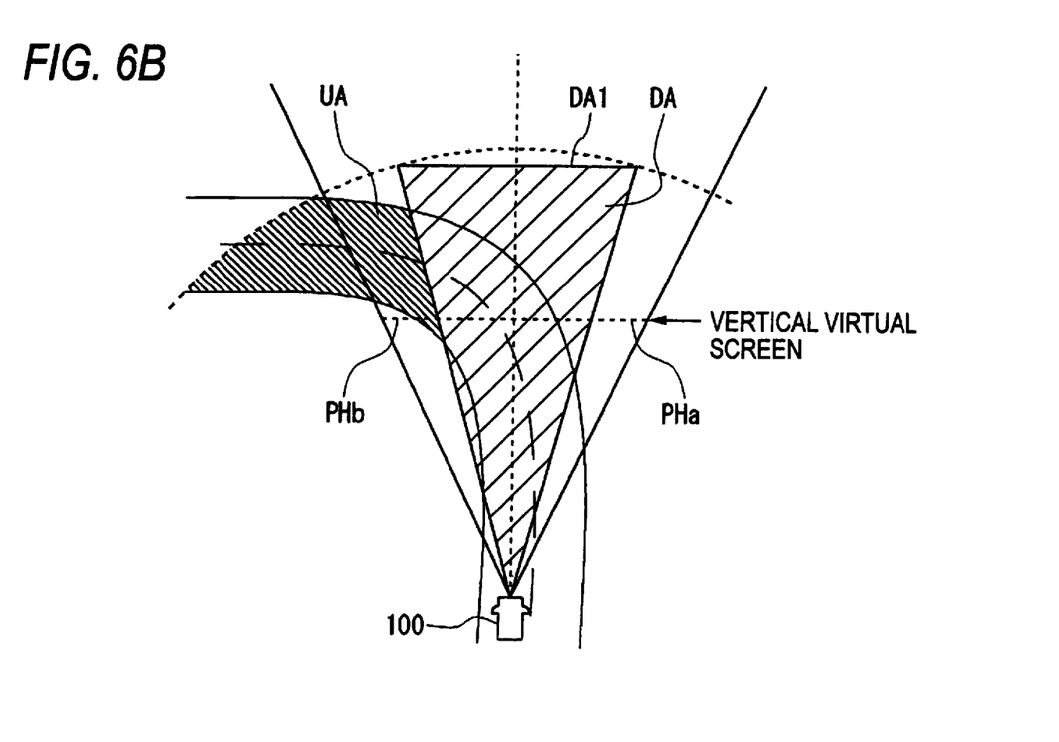

Here, assuming that the vehicle 100 is running on the curved road when the headlamp is in the automatic switching control, control for forming a light distribution pattern of the vehicle headlamp 10 will be described. FIGS. 6A and 6B are schematic views to explain the control for forming the light distribution pattern when the vehicle is running on a left curved road (i.e., a road that curves to the left). FIG. 6A is a diagram illustrating the detectable area DA and the non-detectable area UA on the vertical virtual screen which is disposed at a position of about 25 m in front of the lamp. FIG. 6B is an overhead view schematically illustrating the positions of the detectable area DA and the non-detectable area UA when the vehicle is running on the left curved road.

The road which is extended in front of the vehicle may include a non-detectable area, which is an area outside of the detectable area of the vehicle detection device 150. For example, as shown in FIGS. 6A and 6B, when the vehicle 100 is running on the left curved road, a non-detectable area UA which is outside of the detectable area DA of the vehicle detection device 150 is included ahead of the vehicle on the left, which is an extending direction of the curved road. The vehicle detection device 150 detects the existence of the vehicle in a quadrangular pyramid space (i.e., a view volume). The quadrangular pyramid space is formed by sides of a semi-infinite quadrangular pyramid and a rear surface DA1.

The semi-infinite quadrangular pyramid is formed by connecting four vertexes of the detectable area DA formed on the vertical virtual screen to the image sensing camera on the vehicle 100. The rear surface DA1 is set to be separated from the detectable area DA by a certain distance rearward. This area is an actual detectable area DA. A position of the rear surface DA1, for example, is a limit distance in which the vehicle detection device 150 can sense an image in a backward direction, or a limit distance in which the light illuminated from the high-beam mode lamp 20H can be reached, whichever is shorter. For example, the position of the rear surface DA1 may be about 500 m to about 800 m. Further, the non-detectable area UA, for example, is an area which is outside of the detectable area DA of the vehicle detection device 150 in the existing area of the road ahead and an area included in a circle range which has a radius of the longest distance up to the rear surface DA1 of the detectable area DA from the image sensing camera as a center of the circle. Information on the detectable area of the vehicle detection device 150 is stored in the headlamp control ECU 40.

Figure 7:
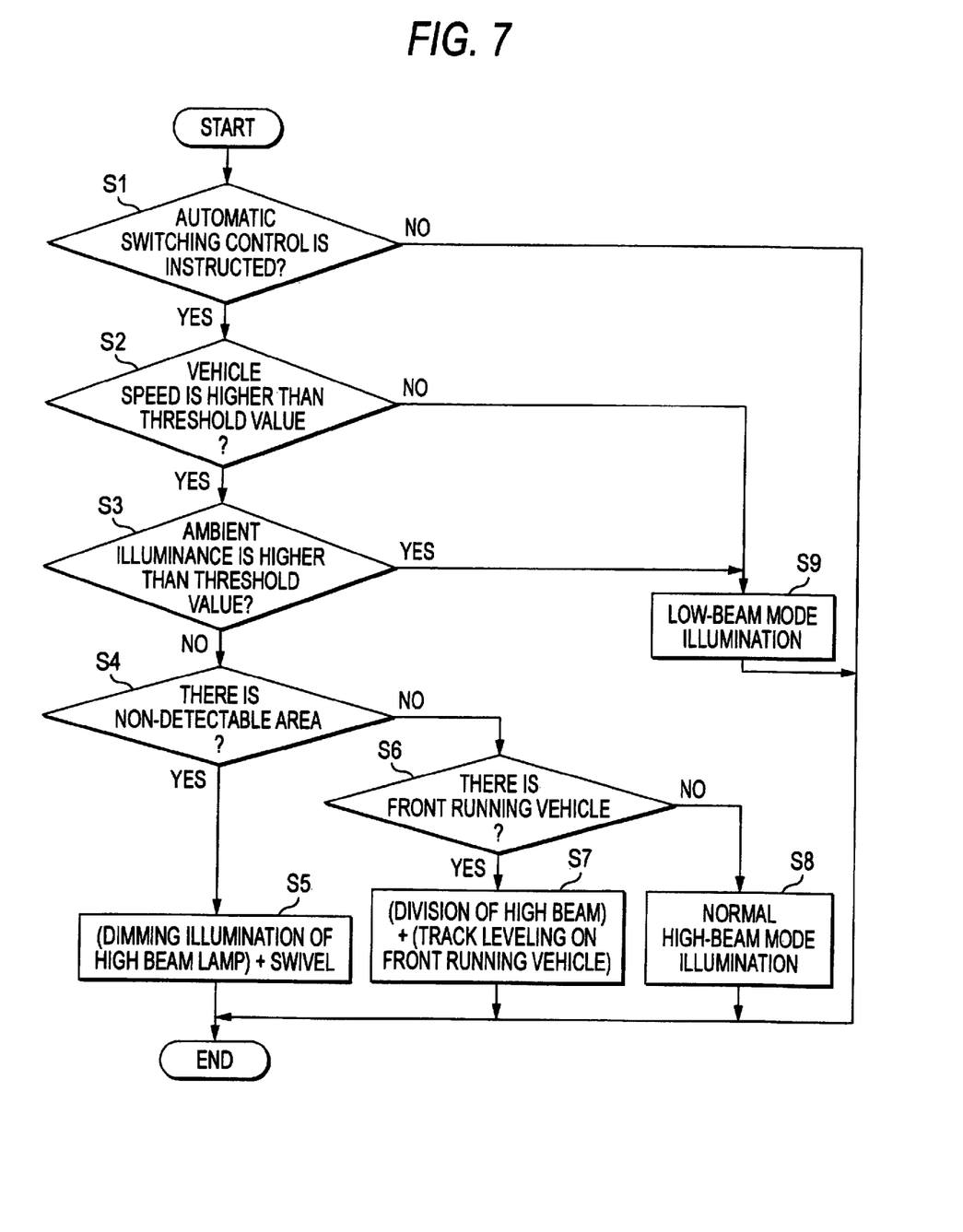
FIG. 7 is a flowchart illustrating the control for forming the light distribution pattern upon performing automatic switching control on the vehicle headlamp of FIG. 1.

FIG. 7 is a flowchart illustrating a control for forming the light distribution pattern upon performing the automatic switching control in the vehicle headlamp 10.

Referring to the flowchart shown in FIG. 7, the headlamp control ECU 40 determines whether or not the automatic switching control is instructed to the headlamp based on the control signal from the vehicle control ECU 140 (Operation 1: hereinafter, abbreviated as "S1". The same is applied in other operations). If it is determined that the automatic switching control is not instructed (No in S1), this routine is completed. On the other hand, if it is determined that the automatic switching control is instructed (Yes in S1), the headlamp control ECU 40 determines whether or not the vehicle speed of the vehicle 100 is higher than a threshold value based on the detection result of the vehicle speed sensor 146 (S2). In this operation, it is determined whether or not the vehicle speed is a speed using a high-beam mode illumination. For example, the speed required of the high-beam mode illumination is 10 km/h or more. If it is determined that the vehicle speed is higher than the threshold value (Yes in S2), the headlamp control ECU 40 determines whether or not an ambient illuminance of the vehicle 100 is higher than a threshold value based on the detection result of the illuminance sensor 152 (S3). In this operation, it is determined whether or not the ambient illuminance is an illuminance using the high-beam mode illumination. For example, the threshold value of the ambient illuminance is set to a value which can determine an urban district or a suburb district. If it is determined that the ambient illuminance corresponds to the suburb district, the high-beam mode illumination is performed. The value used for determining whether the ambient illuminance is from the urban district or the suburb district may be obtained through actual measurement experimentation.

If it is determined that the ambient illuminance of the vehicle 100 is less than the threshold value (No in S3), the headlamp control ECU 40 determines whether or not the non-detectable area UA is included based on the detection result of the vehicle detection device 150 and information contained in the navigation system 144 (S4). For example, the headlamp control ECU 40 may calculate whether the existing area of the road ahead includes the non-detectable area UA. Alternatively, when a shape of the road ahead detected by the navigation system 144 is a certain shape, the headlamp control ECU 40 may determine that the road ahead includes the non-detectable area UA. For example, the shape of the road may be set as a curved shape or an intersection shape. Then, if the shape of the road ahead is determined to be a curved shape or an intersection shape, the headlamp control ECU 40 is determined to include the non-detectable area UA. Accordingly, the automatic switching control can be performed on the headlamp without a heavy calculation load on the headlamp control ECU 40.

Further, in the exemplary embodiment, even though the navigation system 144 is used as the road position detection device, the existing area of the road ahead may be predicted by, for example, the use of steering information or vehicle speed information which is obtained by the steering sensor 142 or the vehicle speed sensor 146.

If it is determined that the non-detectable area UA is included in the existing area of the road ahead (Yes in S4), the headlamp control ECU 40 changes the magnitude of power which is outputted from the power supply circuit 42, and performs dimming illumination on the high-beam mode lamp 20H so as to reduce the high-beam mode light distribution pattern PH down to a lower illuminance. In addition, the high-beam mode lamp 20H is swiveled in accordance with the existing area of the curved road (S5). Even if a current illumination state in the high-beam mode is a state in which the division illumination or the track leveling control on the front running vehicle is being performed, when the non-detectable area UA is included in the existing area of the road ahead, the illuminance of the high-beam mode light distribution pattern PH is uniformly reduced. The lower illuminance indicates an illuminance which cannot cause the glare to the driver of the front running vehicle which may be running in front of the vehicle on the curved road and can secure the visibility of the driver of the vehicle to some degree. Alternatively, in a case where the glare is not caused to the driver of the front running vehicle, the lower illuminance may include a illuminance at which the high-beam mode light distribution pattern PH becomes zero. In other words, the illuminance is decreased by a certain value, and in a case where the illuminance is already at a low value, the illuminance may be decreased to a point at which the high-beam mode light distribution pattern PH becomes zero.

If it is determined that the non-detectable area UA is not included in the existing area of the road ahead (No in S4), the headlamp control ECU 40 determines whether or not the front running vehicle is present based on the detection result of the vehicle detection device 150 (S6). If it is determined that the front running vehicle exists (Yes in S6), the headlamp control ECU 40 changes the magnitude of power which is outputted from the power supply circuit 42 according to the existing area of the vehicle detected by the vehicle detection device 150, and separately adjusts the separate light sources 26a and 26b so as to divisionally illuminate the high-beam light. In addition, the headlamp control ECU 40 performs the track leveling control on the front running vehicle according to the inter-vehicle distance between the front running vehicle and the vehicle, the inter-vehicle distance being detected by the vehicle detection device 150 (S7). In this case, any one of the division illumination in the high-beam mode and the track leveling control on the front running vehicle may be performed.

If it is determined that there is no front running vehicle (No in S6), the illumination state of the headlamp is set to high-beam mode (S8).

In S2, if it is determined that the vehicle speed is less than the threshold value (No in S2), or in S3, if it is determined that the ambient illuminance is higher than the threshold value (Yes in S3), the illumination state of the headlamp is set to the low-beam mode (S9).

In view of the above, in the vehicle headlamp 10 according to an exemplary embodiment, when the automatic switching control between the low-beam mode and the high-beam mode is selected, the low-beam mode and the high-beam mode are automatically switched according to the existence of a front running vehicle. That is, when the front running vehicle is not detected, the illumination state of the headlamp is automatically switched from the low-beam mode to the high-beam mode. Further, the swivel operation in the high-beam mode, the division illumination, and the track leveling control on the front running vehicle are performed in accordance with road conditions. Thus, the visibility of the driver can be secured. On the other hand, when the existence area of the road ahead includes a non-detectable area UA which is out of the detectable area DA of the vehicle detection device 150, in consideration of the possibility that the front running vehicle exists, the illuminance of the high-beam mode light distribution pattern is reduced regardless of the illumination state in the high-beam mode. Therefore, when there is the front running vehicle after passing through the road such as the curved road or the intersection, it is possible to reduce the glare caused to the front running vehicle while securing the visibility of the driver. In addition, even when the front running vehicle experiences glare, since the illuminance of the high-beam mode light distribution pattern is reduced, it is possible to reduce the glare caused to the front running vehicle. Further, even though the front running vehicle is repeatedly in or out of the detectable area DA of the vehicle detection device 150 and the switching control between the low-beam mode and the high-beam mode is often performed, the situation that the driver of the front running vehicle falsely recognizes that someone wants to pass is reduced, and an uncomfortable feeling of the driver in the front running vehicle is reduced.

According to the exemplary embodiment of the present invention described above, the light source 26 of the high-beam mode lamp 20H forms the additional light distribution pattern, and the high-beam mode light distribution pattern PH is the additional light distribution pattern. In this exemplary embodiment, the high-beam mode lamp 20H is an additional mode lamp. However, in an alternative exemplary embodiment of the present invention, the additional light distribution pattern may be formed using the low-beam mode lamp 20L.

In addition, according to another exemplary embodiment of the present invention, the vehicle headlamp 10 may be a so-called two lamp type of vehicle headlamp in which the high-beam mode lamp 20H is formed integrally with the low-beam mode lamp 20L, and the vehicle headlamp 10 may be provided with a shade interposed between the light source 26 and the projector lens 22. In such an exemplary embodiment, the reduction in illuminance of the high-beam mode light distribution pattern is performed according to the pattern of the shade. For example, the shade may be formed by a light transmission type liquid crystal device where a number of minute pixels are arranged in a matrix shape. The minute pixels of the liquid crystal device are controlled by the headlamp control ECU 40 in order to form a shape of a light blocking section in order to reduce the illuminance of the high-beam mode light distribution pattern stepwise or continuously.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A vehicle headlamp comprising:
   a light source which is configured to form a low-beam mode light distribution pattern and an additional light distribution pattern, which is formed above a cut-off line of the low-beam mode light distribution pattern;
   a vehicle detection device which is configured to detect a presence of a front running vehicle;
   a road position detection device which is configured to detect an existing area of a road ahead; and
   a control unit which is configured to acquire information from the vehicle detection device and the road position detection device and, when the existing area includes a non-detectable area which is outside of a detectable area of the vehicle detection device, the control unit controls the light source to reduce an illuminance of the additional light distribution pattern.

2. The vehicle headlamp according to claim 1,
   wherein the light source is capable of increasing or decreasing an illuminance of a partial area of the additional light distribution pattern, and
   wherein the control unit is also configured such that, when the existing area does not include the non-detectable area and the front running vehicle is included in the partial area, the control unit controls the light source such that the illuminance of the partial area is lower than that of areas other than the partial area.

3. The vehicle headlamp according to claim 1,
   wherein the road position detection device detects a shape of the road ahead,
   wherein when the shape of the road ahead corresponds to a shape of a curved road or a shape of an intersection, the control unit determines that the existing area includes the non-detectable area.

4. The vehicle headlamp according to claim 1, wherein the light source comprises a low-beam mode lamp which generates the low-beam light distribution pattern, and an additional mode lamp which generates the additional light distribution pattern.

5. The vehicle headlamp according to claim 1, wherein the light source comprises a shade and a lamp comprising a low-beam mode lamp formed integrally with a high-beam mode lamp,
   wherein the control unit controls the light source to reduce an illuminance of the additional light distribution pattern by controlling the shade.

6. A vehicle headlamp for a vehicle, the vehicle headlamp comprising:
   a light source comprising a low-beam mode lamp which forms a low-beam mode light distribution pattern, and an additional mode lamp which is configured to form an additional light distribution pattern above a cut-off line of the low-beam mode light distribution pattern;
   a vehicle detection device which is configured to detect a presence of another vehicle in a detectable area;
   a road position detection device which is configured to detect a road area of a road in front of the vehicle; and
   a control unit which is configured to acquire information from the vehicle detection device and the road position detection device; to determine if the road area includes an area which is outside the detectable area of the vehicle detection device; and if the road area includes the area which is outside of the detectable area of the vehicle detection device, to control the light source to reduce an illuminance of the additional light distribution pattern.

7. The vehicle headlamp according to claim 6, wherein the additional mode lamp comprises a plurality of separate light sources, each of the separate light sources generating an illuminance of a corresponding partial area of the additional light distribution pattern, and wherein if the road area does not include the area which is outside of the detectable area and if the another vehicle is included in at least one of the partial areas, the control unit controls the light source to reduce the illuminance of the at least one partial area in which the another vehicle is included relative to the remaining partial areas.

8. The vehicle headlamp according to claim 6, further comprising:

a high-beam mode lamp which forms a high-beam distribution pattern.

* * * * *